United States Patent [19]
Ochiai et al.

[11] 3,930,302
[45] Jan. 6, 1976

[54] MACHINE TOOL WITH GUARD COVER APPARATUS

[75] Inventors: Yoshiki Ochiai, Okazabi; Akira Tsuboi, Hekinan; Yoji Kamiya, Anjo, all of Japan

[73] Assignee: Toyoda Machine Works, Ltd., Japan

[22] Filed: Jan. 8, 1975

[21] Appl. No.: 539,513

[30] Foreign Application Priority Data
Feb. 26, 1974   Japan............................. 49-22989

[52] U.S. Cl. ................................ 29/568; 214/1 BD
[51] Int. Cl.² ................. B23Q 3/157; B23Q 11/08
[58] Field of Search .......... 29/560, 26 A; 214/1 BD; 83/DIG. 1; 408/710

[56] References Cited
UNITED STATES PATENTS
3,355,799   12/1967   Daugherty ........................... 29/568
3,821,844   7/1974   Harman et al. ...................... 29/568

Primary Examiner—J. M. Meister
Assistant Examiner—Z. R. Bilinsky
Attorney, Agent, or Firm—Oblon, Fisher, Spivak, McClelland & Maier

[57] ABSTRACT

A machine tool includes an automatic tool change device for changing a tool between a tool change position on a tool storage magazine and a spindle by a tool change arm. A pair of guard covers are arranged between the tool change position and the spindle to be pivoted in a horizontal plane. A drive means is provided for normally maintaining the guard covers closed and for opening the guard covers to permit a tool change operation.

3 Claims, 2 Drawing Figures

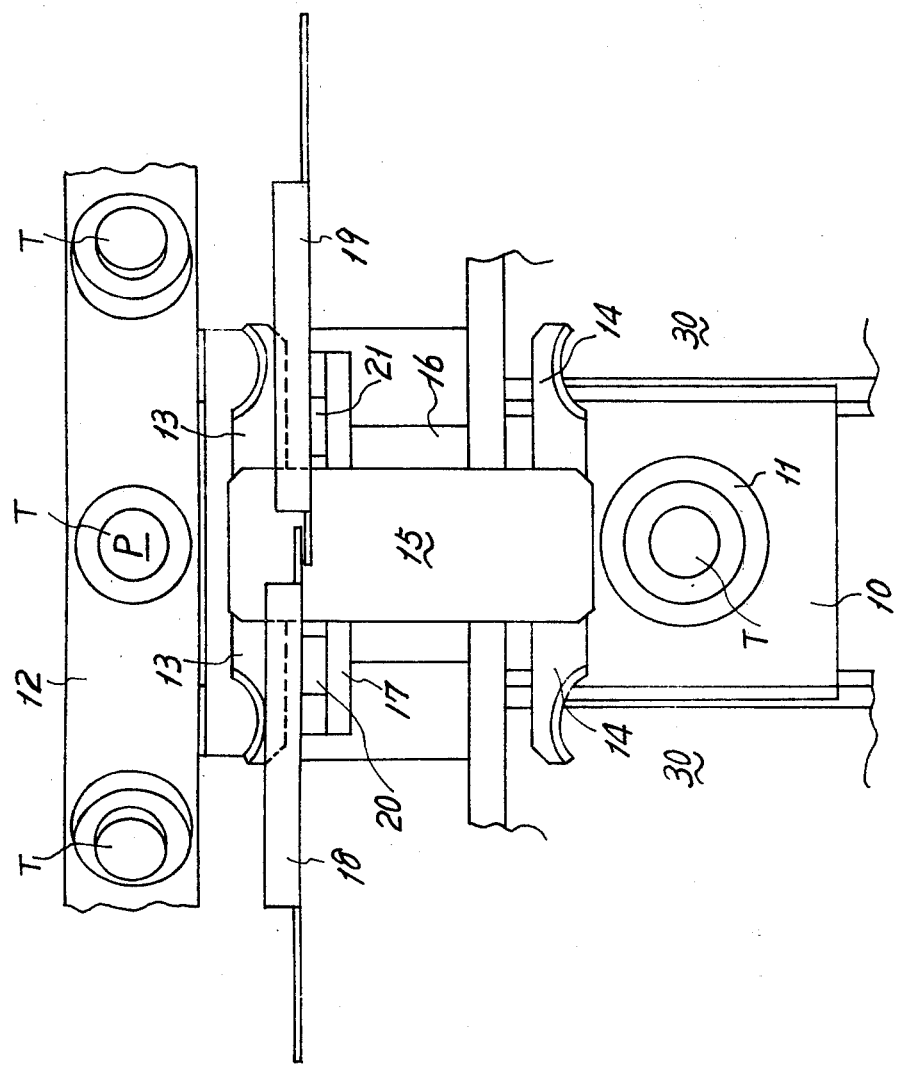

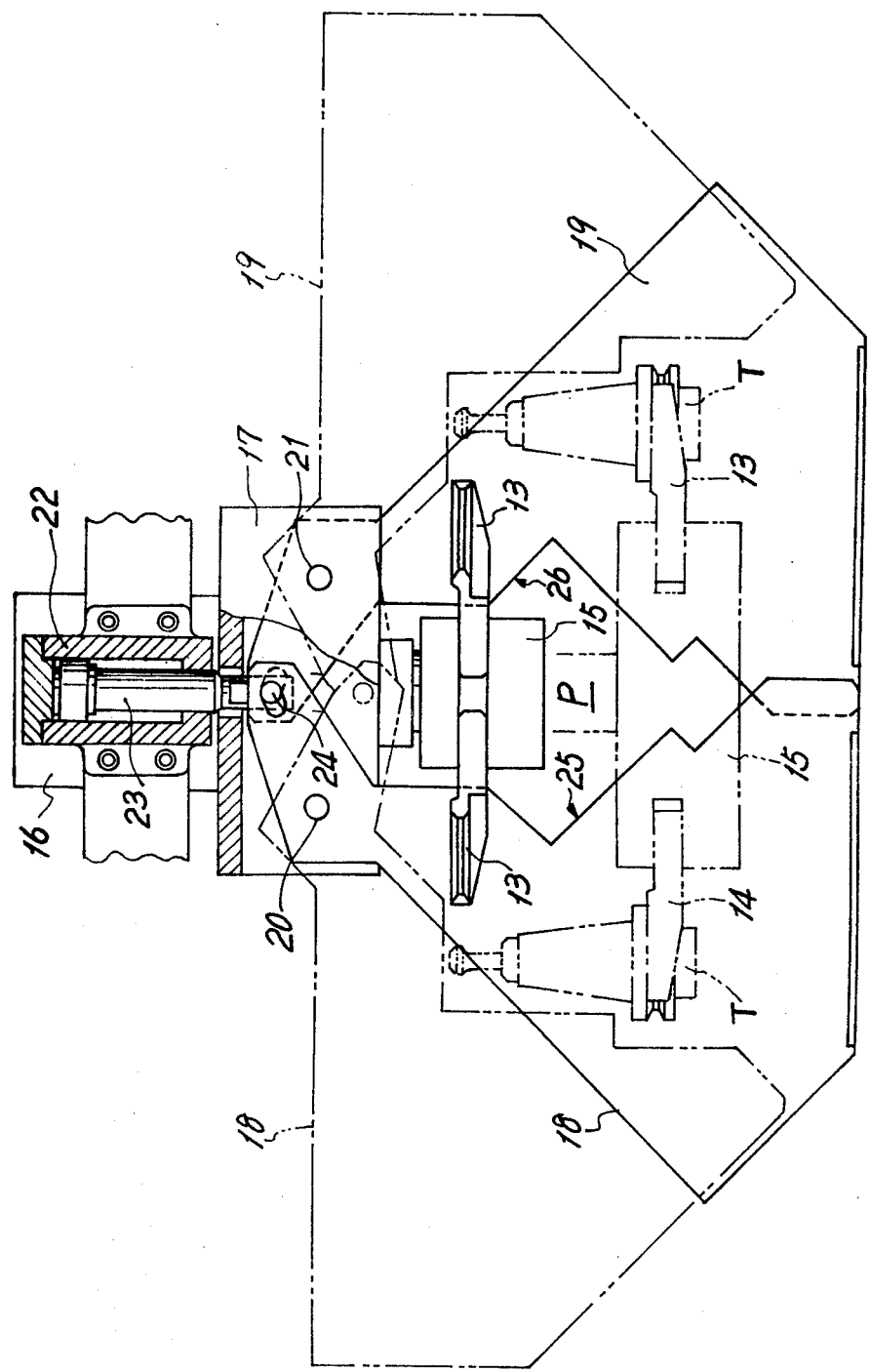

MACHINE TOOL WITH GUARD COVER APPARATUS

BACKGROUND OF THE INVENTION

The present invention relates to a machine tool provided with an automatic tool change device and a guard cover apparatus.

In a machine tool with an automatic tool change device wherein a tool storage magazine storing a plurality of radially arranged tools is provided above a spindle, a guard cover or net has usually been provided below the tool magazine over an entire circumference of the magazine in order to prevent an operator from being injured, even if a tool accidentally falls from the magazine. However, the guard cover or net has not in the past been covered at the vicinity of the tool change position on the magazine such that the tool change operation may be performed between the tool change position and the spindle. Therefore, there has existed the risk of the tool falling through the uncovered portion and interfering with a tool which is rotating at the machining position, such that a serious accident could occur.

SUMMARY OF THE INVENTION

It is therefore an object of the present invention to provide a machine tool having a guard cover apparatus arranged between a tool change position on a tool storage magazine and a spindle and normally maintained closed but opened at the time of a tool change operation whereby safety of an operator can be positively assured and a tool can be positively prevented from falling on a machining position, even if a tool accidentally falls from any position of the magazine.

BREIF DESCRIPTION OF THE DRAWINGS

The foregoing and other objects of the present invention will be more fully appreciated as the same becomes better understood from the following detailed description of the preferred embodiment, when considered in connection with the accompanying drawings in which;

FIG. 1 is a front view of a machine tool having a guard cover apparatus according to the present invention; and FIG. 2 is a plan view, partly in section, of the guard cover apparatus.

DETAILED DESCRIPTION OF THE PREFERRED EMBODIMENT

Referring now to the drawings, wherein like reference characters refer to identical or corresponding parts throughout the views, and more particularly to FIG. 1 wherein there is shown a spindle head 10 slidably mounted on a column 30 for vertical movement. A spindle 11, for receiving a tool T to perform a machining operation, is rotatably mounted in the spindle head 10. A tool storage magazine 12 is mounted above the spindle head 10 on the column 30 to be rotated and indexed in a horizontal plane. A plurality of tools T are radially retained on the circumference of the tool storage magazine 12 and are successively indexed to a tool change position P on the magazine 12 which position is aligned with the spindle 11. In order to perform a tool change operation between the tool change position P on the magazine 12 and the spindle 11, a tool change arm 15 is mounted on a support 16 which is in turn mounted on the column 30 in such a manner that the change arm 15 is rotated in a vertical plane and shifted in a horizontal plane. The tool change arm 15 is provided on opposite ends thereof with pairs of pivotal fingers 13 and 14 which are normally opened but closed to grip tools held at the tool change position P of the magazine 12 and the spindle 11 to perform a tool change operation.

Fixedly mounted on the support 16 is a block 17 which pivotally supports, through pins 20 and 21, a pair of guard covers 18 and 19 arranged between the spindle head 10 and the tool storage magazine 12. Provided on the support 16 is a hydraulic actuator 22 in which a piston rod 23 is slidably received to open and close the guard covers 18 and 19 in a horizontal plane. A pin 24 is fixed to the end of the piston rod 23 and is engaged with elongate slots formed on one end of each of the guard covers 18 and 19. The guard covers 18 and 19 are respectively provided with notches 25 and 26 so that the guard covers 18 and 19 do not interfere with tools held by fingers 13 and 14 of the tool change arm 15 at the time of a tool change operation when the same are opened. When closed, the guard covers 18 and 19 extend over the tool change arm 15, positioned as shown in FIG. 1, without interference with the same and the other ends of the guard covers 18 and 19 are superposed with each other, as shown in solid lines in FIG. 2, such that a tool T dropping from the tool change position P or the vicinity thereof can be caught by the guard covers 18 and 19. When the piston 24 is moved to the advanced position thereof to open the guard covers 18 and 19, as shown in phantom lines in FIG. 2, a tool change operation can be performed between tools held at the tool change position P and the spindle 11 without interference of the tools with the guard covers 18 and 19. Although not shown in the drawings, a guard cover is fixed to the column 30 over an entire circumference of the magazine 12 except at the tool change position P and the vicinity thereof to catch a tool dropping from any position of the magazine 12.

In operation, when a predetermined machining operation is completed by a tool T held in the spindle 11, the spindle head 10 is moved to the upper limit end thereof for a tool change operation. The fingers 13 and 14 of the tool change arm 15 are then closed to grip tools held in the tool change position P and the spindle 11. The hydraulic actuator 22 is subsequently actuated to advance the piston rod 23 to thereby open the guard covers 18 and 19. In response to confirmation of the opening of the guard covers 18 and 19, the tool change arm 15 is shifted to the advanced end thereof and to the retracted end thereof to insert the changed tools into the tool change position P and the spindle 11, whereby a tool change operation is performed between the tool change position P and the spindle 11. Thereafter, the guard covers 18 and 19 are closed by actuation of the hydraulic actuator 22. In response to confirmation of the closing of the guard covers 18 and 19, the fingers 13 and 14 of the tool change arm 15 are opened to release the changed tools, whereby a tool change operation is completed. Thereafter, the spindle head 10 is moved downwardly to a predetermined position for the next machining operation.

Obviously, numerous modifications and variations of the present invention are possible in light of the above teaching. It is therefore to be understood that within the scope of the teaching herein and the appended claims the invention may be practiced otherwise than as specifically described herein.

What is claimed as new and desired to be secured by Letters Patent of the United States is:

1. A machine tool comprising:
    a tool storage magazine for storing a plurality of radially arranged tools in a horizontal plane and provided with a tool change position;
    a spindle for receiving a tool from said magazine to perform a machining operation;
    a tool change arm for changing respective tools between the tool change position on said magazine and said spindle;
    a pair of guard covers arranged between said tool change position and said spindle and capable of being pivoted in a horizontal plane; and drive means operatively connected with one end of each of said guard covers for normally maintaining said guard covers closed to receive a tool which may accidentally fall from said magazine and for opening said guard covers to permit a tool change operation between said tool change position and said spindle.

2. A machine tool according to claim 1, wherein each of said guard covers is provided with a notch such that a tool change operation may be performed without said tool change arm interfering with said guard covers.

3. A machine tool according to claim 1, wherein the other end of one of said guard covers is superposed with the other end of the other of said guard covers when said guard covers are closed.

* * * * *